United States Patent
Crumb et al.

(10) Patent No.: US 12,147,546 B2
(45) Date of Patent: Nov. 19, 2024

(54) COMPUTER METHOD FOR ENTRY OF PLURAL INPUT MODALITIES ONTO A SECURE DISCLOSURE BLOCKCHAIN

(71) Applicant: ABAXX TECHNOLOGIES CORP., Christ Church (BB)

(72) Inventors: Joshua Crumb, Christ Church (BB); Timothy M. Londergan, Seattle, WA (US); Christopher A. Wiklof, Everett, WA (US)

(73) Assignee: ABAXX TECHNOLOGIES CORP., Christ Church (BB)

( * ) Notice: Subject to any disclaimer, the term of this patent is extended or adjusted under 35 U.S.C. 154(b) by 329 days.

(21) Appl. No.: 17/407,835

(22) Filed: Aug. 20, 2021

(65) Prior Publication Data

US 2022/0043919 A1     Feb. 10, 2022

Related U.S. Application Data

(63) Continuation of application No. PCT/US2019/048423, filed on Aug. 27, 2019.

(60) Provisional application No. 62/808,643, filed on Feb. 21, 2019.

(51) Int. Cl.
| | |
|---|---|
| *G06F 21/60* | (2013.01) |
| *G06F 3/04817* | (2022.01) |
| *G06F 3/0486* | (2013.01) |
| *G10L 15/26* | (2006.01) |
| *H04L 9/06* | (2006.01) |
| *H04L 9/08* | (2006.01) |
| *H04L 51/046* | (2022.01) |
| *H04N 7/15* | (2006.01) |
| *H04L 9/00* | (2022.01) |

(52) U.S. Cl.
CPC ........ *G06F 21/602* (2013.01); *G06F 3/04817* (2013.01); *G06F 3/0486* (2013.01); *G10L 15/26* (2013.01); *H04L 9/0643* (2013.01); *H04L 9/0894* (2013.01); *H04L 51/046* (2013.01); *H04N 7/155* (2013.01); *H04L 9/50* (2022.05)

(58) Field of Classification Search
CPC .. G06F 21/602; G06F 3/04817; G06F 3/0486; G06F 2221/2107; G10L 15/26; H04L 9/0643; H04L 9/0894; H04L 9/50; H04L 9/32; H04L 51/046; H04L 67/10; H04N 7/155

See application file for complete search history.

(56) References Cited

U.S. PATENT DOCUMENTS

| | | | |
|---|---|---|---|
| 9,807,067 B1 * | 10/2017 | Ryan | H04L 9/0894 |
| 10,417,217 B2 | 9/2019 | Pierce et al. | |
| 11,170,128 B2 | 11/2021 | Kurian | |
| 2006/0080208 A1 | 4/2006 | Harrison | |

(Continued)

OTHER PUBLICATIONS

PCT International Search Report and Written Opinion for International Application No. PCT/US2019/048423 dated Dec. 12, 2019, pp. 10.

(Continued)

*Primary Examiner* — Khoi V Le
(74) *Attorney, Agent, or Firm* — Panitch Schwarze Belisario & Nadel LLP

(57) ABSTRACT

Computer methods, apparatuses, and graphical user interfaces include placing one or more electronic messages in cloud storage that is defined by or accessed by a blockchain data structure.

12 Claims, 3 Drawing Sheets

(56) References Cited

U.S. PATENT DOCUMENTS

| | | |
|---|---|---|
| 2006/0235779 A1 | 10/2006 | Drew et al. |
| 2009/0248563 A1 | 10/2009 | Deasy et al. |
| 2011/0145030 A1 | 6/2011 | Allen |
| 2011/0213694 A1 | 9/2011 | Burns et al. |
| 2011/0258101 A1 | 10/2011 | Albertelli et al. |
| 2012/0130923 A1 | 5/2012 | Shah |
| 2013/0054405 A1 | 2/2013 | Rabenold et al. |
| 2014/0025524 A1 | 1/2014 | Sims et al. |
| 2014/0297400 A1 | 10/2014 | Sandholm |
| 2015/0032512 A1 | 1/2015 | Bateni |
| 2015/0310424 A1* | 10/2015 | Myers ................. G06Q 20/401 705/69 |
| 2016/0321654 A1* | 11/2016 | Lesavich ............... H04L 67/104 |
| 2017/0005804 A1* | 1/2017 | Zinder .................. H04L 9/3239 |
| 2018/0204213 A1 | 7/2018 | Zappier et al. |
| 2019/0080392 A1 | 3/2019 | Youb et al. |
| 2019/0245688 A1* | 8/2019 | Patin ...................... H04L 9/321 |
| 2019/0354945 A1 | 11/2019 | Mahajan et al. |
| 2020/0184546 A1 | 6/2020 | Crumb et al. |
| 2020/0184558 A1 | 6/2020 | Crumb et al. |
| 2020/0184565 A1 | 6/2020 | Crumb et al. |
| 2020/0252457 A1* | 8/2020 | Zakrzewski .......... H04L 9/0637 |
| 2021/0035092 A1 | 2/2021 | Pierce et al. |
| 2021/0264520 A1 | 8/2021 | Cummings |

OTHER PUBLICATIONS

Office Action (First Examination Report) issued Feb. 13, 2023, by the Intellectual Property Office of Singapore in corresponding Singaporean Patent Application No. 11202109098X. (5 pages).

Office Action (Notice of Eligibility of Grant) issued Feb. 14, 2023, by the Intellectual Property Office of Singapore in corresponding Singaporean Patent Application No. 11202109098X. (1 page).

Eskandari et al.. , (On the feasibility of decentralized deivatives markets) 2018.

* cited by examiner

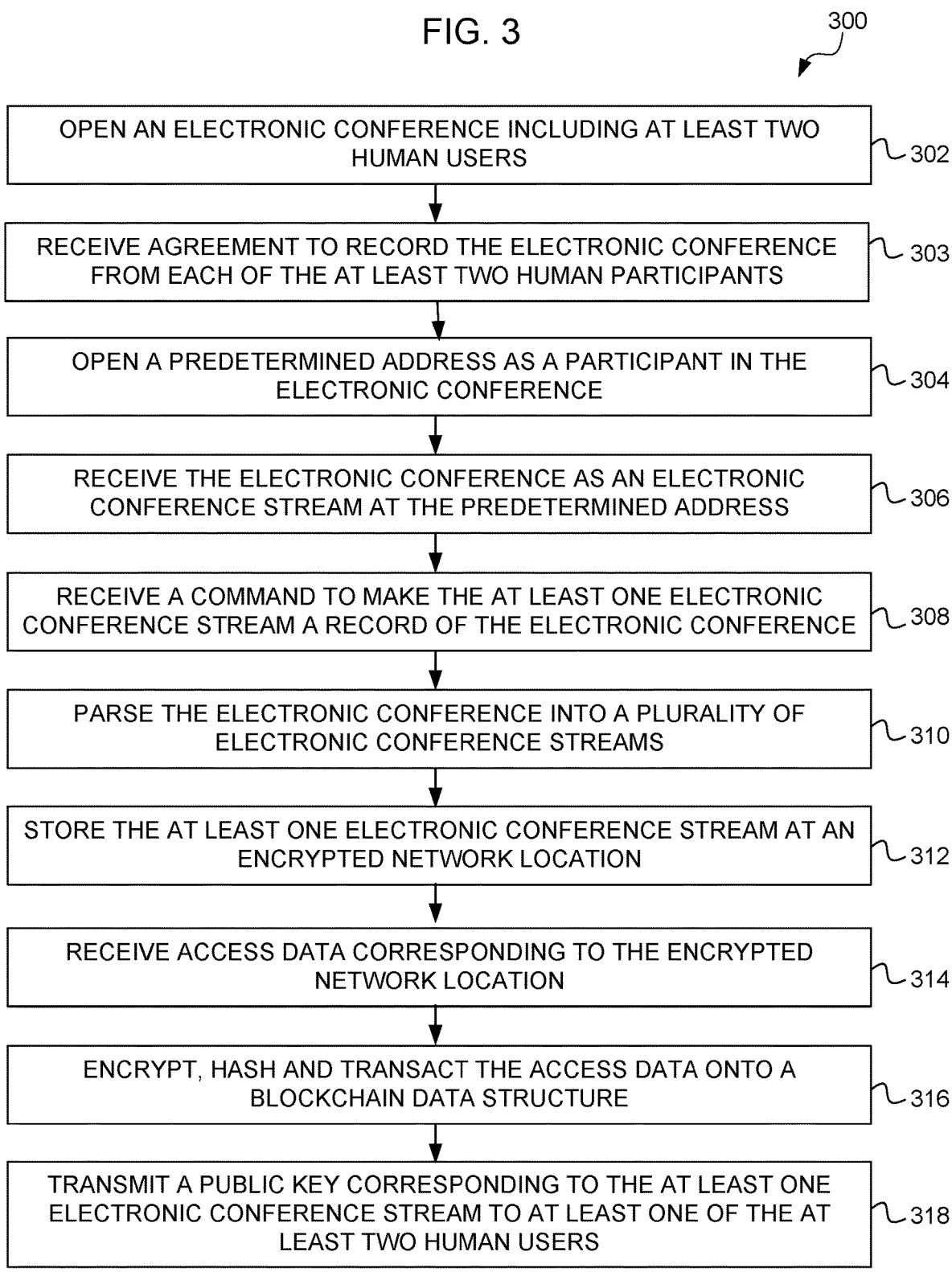

COMPUTER METHOD FOR ENTRY OF PLURAL INPUT MODALITIES ONTO A SECURE DISCLOSURE BLOCKCHAIN

CROSS REFERENCE TO RELATED APPLICATIONS

The present application is a Continuation that claims priority benefit from PCT Application No. PCT/US2019/048423, entitled "COMPUTER METHOD FOR ENTRY OF PLURAL INPUT MODALITIES ONTO A SECURE DISCLOSURE BLOCKCHAIN", filed Aug. 27, 2019. PCT Application No. PCT/US2019/048423 claim priority benefit from U.S. Provisional Patent Application No. 62/808,643, entitled "COMPUTER METHOD FOR ENTRY OF PLURAL INPUT MODALITIES ONTO A SECURE DISCLOSURE BLOCKCHAIN," filed Feb. 21, 2019, to the extent not inconsistent with the disclosure herein, is incorporated by reference.

SUMMARY

According to an embodiment, a computer method includes storing, in a first computer memory, a cryptographic key for a blockchain that carries encrypted data corresponding to tracked information, and receiving new data corresponding to new information into a second computer memory via an electronic interface. The computer method includes encrypting the new data with a computer processor, and with the computer processor using the cryptographic key, associating the new data with the blockchain. The new information becomes a portion of the tracked information.

According to an embodiment, a non-transitory computer readable medium carrying a computer program and instructions is selected to cause an electronic device to display, on an electronic display, a graphical user interface (GUI). The GUI includes a folders region displaying a plurality of folders corresponding to a message organization structure. At least one folder of the plurality of folders corresponds to a blockchain storage instance. The GUI also includes a messages region displaying at least one message icon. The at least one message icon corresponds to an electronic message (e.g., a received electronic message) carrying new information that is intended to be indexed using the blockchain storage instance. The GUI is programmed to receive a user input to drag the at least one message icon to a blockchain storage instance icon. The computer program and instructions include a computer program and instructions to encrypt, hash, store, and index at least the electronic message corresponding to the at least one message icon onto a blockchain data structure having instance parameters corresponding to the blockchain storage instance icon.

According to an embodiment, a computer method for making an immutable record of a conversation includes opening an electronic conference including at least two human users, opening a predetermined address as a participant in the electronic conference, receiving the electronic conference as an electronic conference stream at the predetermined address, and receiving a command to make the at least one electronic conference stream a record of the electronic conference. The computer method for making an immutable record of a conversation also includes storing the at least one electronic conference stream at an encrypted network location, receiving access data corresponding to the encrypted network location, encrypting, hashing and transacting the access data onto a blockchain data structure, and transmitting a public key corresponding to the at least one electronic conference stream to at least one of the at least two human users.

BRIEF DESCRIPTION OF THE DRAWINGS

FIG. 3 is a flow chart showing a computer method for making an immutable record of a conversation, according to an embodiment.

DETAILED DESCRIPTION

Figure 1:
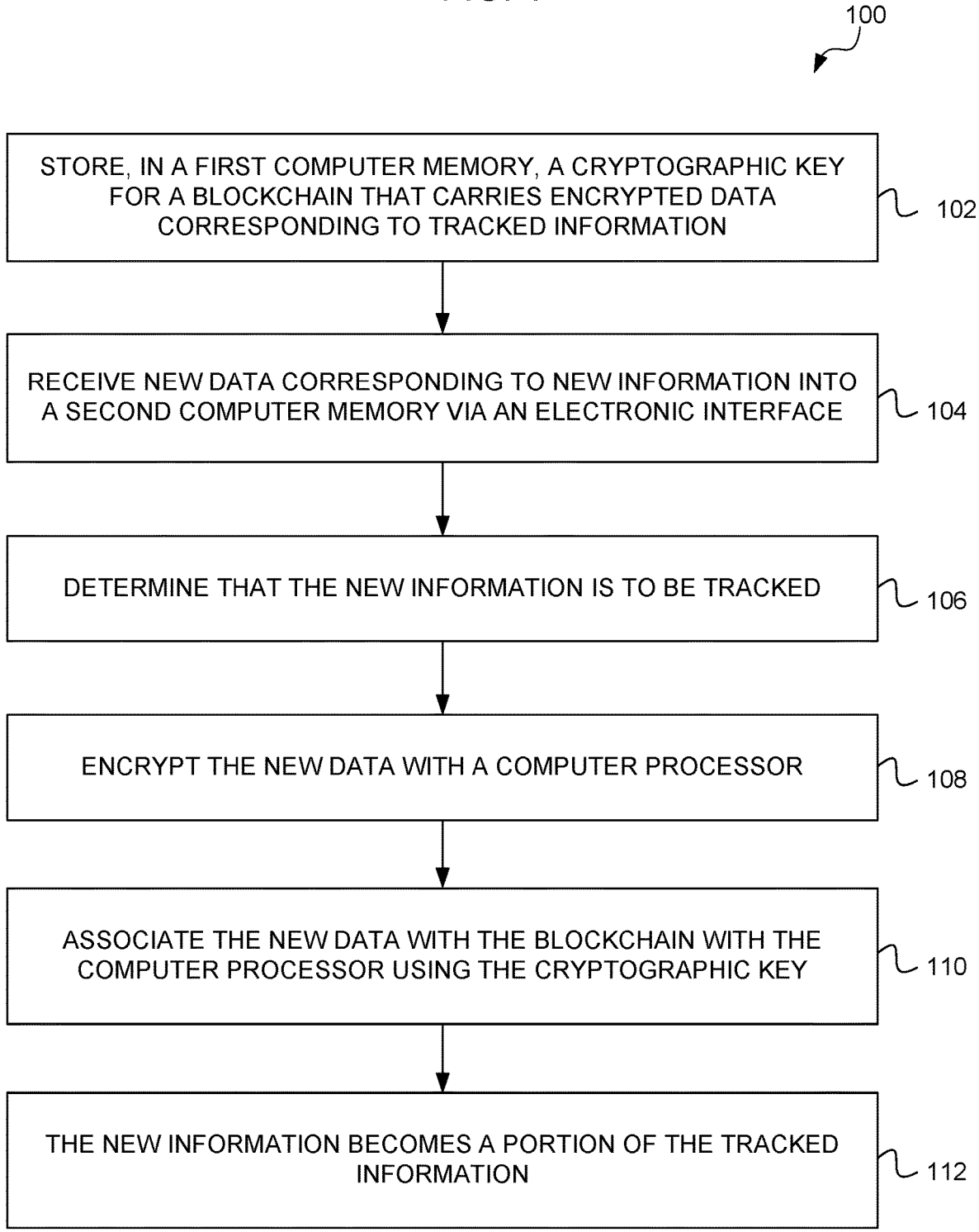
FIG. 1 is a flow chart showing a computer method, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

FIG. 1 is a flow chart showing a computer method 100, according to an embodiment. The computer method 100 includes, in step 102, storing, in a first computer memory, a cryptographic key for a blockchain that carries encrypted data corresponding to tracked information. Step 104 includes receiving new data corresponding to new information into a second computer memory via an electronic interface. Step 108 includes encrypting the new data with a computer processor. Step 110 includes, with the computer processor using the cryptographic key, associating the new data with the blockchain, and in step 112, the new information becomes a portion of the tracked information. The computer method 100 further includes, in step 106, determining that the new information is to be tracked.

According to an embodiment, receiving the new data corresponding to the new information into the second computer memory via the electronic interface, in step 104, includes receiving an electronic message carrying at least a portion of the new information. In one embodiment, the electronic message is received at an electronic message (e.g., email, vmail, text, or messaging application) address that is designated to receive information that is to be tracked. The electronic message may include an electronic mail message when the electronic message address is an electronic mail address. Additionally or alternatively, the electronic message may include an electronic text message when the electronic message address is an electronic text-receiving telephone number. In another embodiment, the electronic message may include an electronic text protocol when the electronic message address comprises a universally unique identity (UUID), also referred to as a globally unique identifier (GUID), associated with a personal device that runs an application for receiving the electronic text protocol. The UUID may include a verified identifier (e.g., an IMEI) of a personal electronic device.

Figure 2:
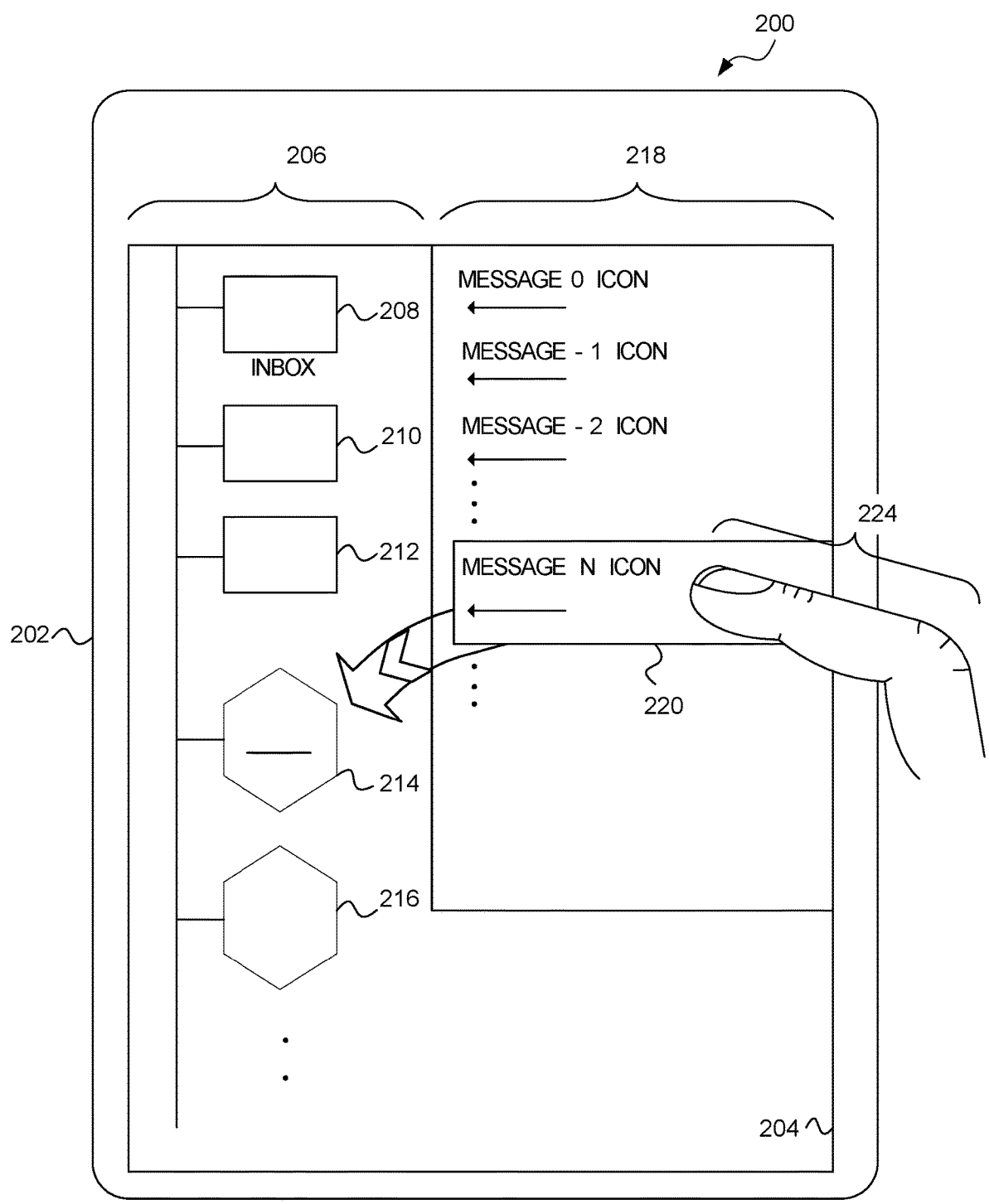
FIG. 2 is a diagram showing a graphical user interface (GUI) for transferring a received electronic message into a blockchain storage, according to an embodiment.

According to an embodiment, step 106 further may include determining that the electronic message carries new information that is intended to be tracked. In one embodiment, determining that the electronic message carries new information that is intended to be tracked may include receiving a graphical command from a user, via a graphical user interface (GUI), indicating that the new information is to be tracked. Receiving the graphical command from the user may include receiving a GUI command including dragging a message icon onto a blockchain storage icon to save the new information in a folder corresponding to storage associated with the blockchain, as depicted in FIG. 2.

According to an embodiment, returning to FIG. 1, receiving the electronic message, in step 104, includes receiving an electronic message attachment, and associating the new data with the blockchain, in step 110, includes associating electronic attachment data with the blockchain. In another embodiment, receiving the electronic message, in step 104, includes receiving an electronic link in the electronic message, and associating the new data with the blockchain, in step 110, includes associating the electronic link with the blockchain. Additionally or alternatively, receiving the electronic message, in step 104, includes receiving an electronic link in the electronic message and accessing data corresponding to the electronic link, and associating the new data with the blockchain, in step 110, includes associating the data corresponding to the electronic link with the blockchain.

According to an embodiment, the electronic message includes an email message. In another embodiment, the electronic message includes a text message. Additionally or alternatively, the electronic message includes a voice message.

According to an embodiment, the computer method 100 further may include performing a voice-to-text conversion on the voice message. In other embodiments, the voice message may be directly associated with the blockchain as an audio file.

According to an embodiment, the computer method 100 further may include recording a voice call to make a voice call recording. Receiving the new data may include receiving the voice call recording. In another embodiment, the computer method 100 further may include recording a video conference to make a video conference recording. Receiving the new data may include receiving the video conference recording.

According to an embodiment, associating the new data with the blockchain, in step 110, includes writing the new data onto the blockchain as one or more transactions. According to an embodiment, the computer method 100 further includes writing the new data to one or more secret addresses. Associating the new data with the blockchain, in step 110, may include writing data corresponding to the one or more secret addresses onto the blockchain as one or more transactions. In one embodiment, writing the new data to the one or more secret addresses may include writing the new data using BigchainDB. In another embodiment, writing the new data to the one or more secret addresses includes writing the new data to a Monero blockchain as tx_extra data. Associating the new data with the blockchain, in step 110, may include writing data corresponding to a Monero blockchain transaction identity and a corresponding Monero blockchain private key.

According to an embodiment, the first computer memory and the second computer memory are the same computer memory. In another embodiment, the second computer memory may include a remote memory different than the first computer memory.

FIG. 2 is a diagram showing a graphical user interface (GUI) 200 for transferring a received electronic message into a blockchain storage, according to an embodiment.

According to an embodiment, a non-transitory computer readable medium carrying a computer program and instructions selected to cause an electronic device 202 may display, on an electronic display 204, a graphical user interface (GUI) 200. The GUI 200 may include a folders region 206 displaying a plurality of folders 208, 210, 212, 214, 216 corresponding to a message organization structure. In an embodiment, at least one folder 214 of the plurality of folders 208, 210, 212, 214, 216 corresponds to a blockchain storage instance. The GUI 200 may also include a messages region 218 displaying at least one message (N) icon 220. In an embodiment, the at least one message (N) icon 220 corresponds to an electronic message (e.g., a received electronic message) carrying new information that is intended to be indexed using the folder indicating a blockchain storage instance 214. In an embodiment, the GUI 200 may be programmed to receive a user input 224 to drag the at least one message (N) icon 220 to a blockchain storage instance icon 214. In an embodiment, the computer program and instructions includes computer program and instructions to encrypt, hash, store, and index at least the electronic message corresponding to the at least one message (N) icon 220 onto one or more blockchain data structures having instance parameters corresponding to the blockchain storage instance icon 214.

FIG. 3 is a flow chart showing a computer method 300 for making an immutable record of an electronically transmitted conversation, such as a telephone conference or a video conference, according to an embodiment.

According to an embodiment, the computer method 300 for making an immutable record of a conversation includes, in step 302, opening an electronic conference including at least two human users. Step 304 includes opening a predetermined address as a participant in the electronic conference. Step 306 includes receiving the electronic conference as an electronic conference stream at the predetermined address. Step 308 includes receiving a command to make the at least one electronic conference stream a record of the electronic conference. Step 312 includes storing the at least one electronic conference stream at an encrypted network location. Step 314 includes receiving access data corresponding to the encrypted network location. Step 316 includes encrypting, hashing and transacting the access data onto a blockchain data structure. Step 318 includes transmitting a public key corresponding to the at least one electronic conference stream to at least one of the at least two human users.

According to an embodiment, the computer method 300 for making an immutable record of a conversation further includes, in step 310, parsing the electronic conference into a plurality of electronic conference streams. Referring to step 312, in an embodiment, storing the at least one electronic conference stream at the encrypted network location includes storing each of the plurality of electronic conference streams at a respective encrypted network location. Referring to step 314, in an embodiment, receiving the access data corresponding to the encrypted network location includes receiving respective access data for each of the plurality of electronic conference streams. Referring to step 316, in an embodiment, encrypting, hashing and transacting the access data onto the blockchain data structure includes encrypting, hashing, and transacting the plurality of electronic conference streams onto the blockchain data structure.

According to an embodiment, in step 308, receiving the command to make the at least one electronic conference stream the record of the electronic conference is performed after a moment in time corresponding with a starting moment of the electronic conference stream. In one embodiment, the electronic conference includes a video conference. In another embodiment, the electronic conference includes a telephone conference.

According to an embodiment, the blockchain data structure includes a private blockchain. Additionally or alternatively, the blockchain data structure includes a public blockchain.

According to an embodiment, the computer method 300 for making an immutable record of a conversation further includes determining an encryption address corresponding to a blockchain address assigned to at least one of at least two human participants. In an embodiment, determining the encryption address includes receiving a username from the at least one of the at least two human participants, and receiving a command to establish a new set of recorded data or to update an existing set of recorded data.

According to an embodiment, the computer method 300 for making an immutable record of a conversation further includes reporting metadata for the electronic conference to at least one sponsor address. In an embodiment, the at least one sponsor address comprises at least one enterprise address, wherein the at least one enterprise corresponds to an employer of at least one of the at least two human participants.

According to an embodiment, the computer method 300 for making an immutable record of a conversation further includes, in step 303, receiving agreement to record the electronic conference from each of the at least two human participants. In an embodiment, receiving the agreement to record includes placing a click-wrap agreement on each of the at least two human participant GUIs, and receiving user agreement and acknowledgement from each human participant via the GUIs.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A computer method for making an immutable record of a conversation, comprising:
opening an electronic conference including at least two human users;
opening a predetermined address as a participant in the electronic conference;
receiving the electronic conference as an electronic conference stream at the predetermined address;
receiving a command to make the at least one electronic conference stream a record of the electronic conference;
parsing the electronic conference into a plurality of electronic conference streams;
storing the at least one electronic conference stream at an encrypted network location, wherein the storing the at least one electronic conference stream at the encrypted network location includes storing each of the plurality of electronic conference streams at a respective encrypted network location;
receiving access data corresponding to the encrypted network location, wherein the receiving the access data corresponding to the encrypted network location includes receiving respective access data for each of the plurality of electronic conference streams;
encrypting, hashing and transacting the access data onto a blockchain data structure, wherein the encrypting, hashing and transacting the access data onto the blockchain data structure includes encrypting, hashing, and transacting the plurality of electronic conference streams onto the blockchain data structure; and
transmitting a public key corresponding to the at least one electronic conference stream to at least one of the at least two human users.

2. The computer method for making an immutable record of a conversation of claim 1, wherein receiving the command to make the at least one electronic conference stream the record of the electronic conference is performed after a moment in time corresponding with a starting moment of the electronic conference stream.

3. The computer method for making an immutable record of a conversation of claim 1, wherein the electronic conference comprises a video conference.

4. The computer method for making an immutable record of a conversation of claim 1, wherein the electronic conference comprises a telephone conference.

5. The computer method for making an immutable record of a conversation of claim 1, wherein the blockchain data structure comprises a private blockchain.

6. The computer method for making an immutable record of a conversation of claim 1, wherein the blockchain data structure comprises a public blockchain.

7. The computer method for making an immutable record of a conversation of claim 1, further comprising:
determining an encryption address corresponding to a blockchain address assigned to at least one of at least two human participants.

8. The computer method for making an immutable record of a conversation of claim 1, wherein determining the encryption address comprises:
receiving a username from the at least one of the at least two human participants; and
receiving a command to establish a new set of recorded data or to update an existing set of recorded data.

9. The computer method for making an immutable record of a conversation of claim 1, further comprising:
reporting metadata for the electronic conference to at least one sponsor address.

10. The computer method for making an immutable record of a conversation of claim 1, wherein the at least one sponsor address comprises at least one enterprise address, wherein the at least one enterprise corresponds to an employer of at least one of the at least two human participants.

11. The computer method for making an immutable record of a conversation of claim 1, further comprising:
receiving agreement to record the electronic conference from each of the at least two human participants.

12. The computer method for making an immutable record of a conversation of claim 11, wherein receiving the agreement to record comprises:
placing a click-wrap agreement on each of the at least two human participant GUIs; and
receiving user agreement and acknowledgement from each human participant via the GUIs.

* * * * *